No. 690,690. Patented Jan. 7, 1902.
J. A. BEAM.
THRESHING MACHINE.
(Application filed June 11, 1900. Renewed Oct. 2, 1901.)
(No Model.)
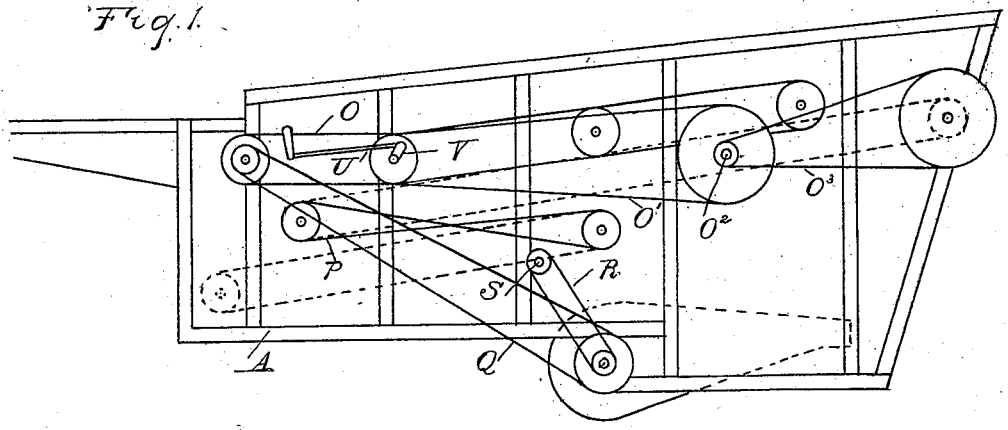
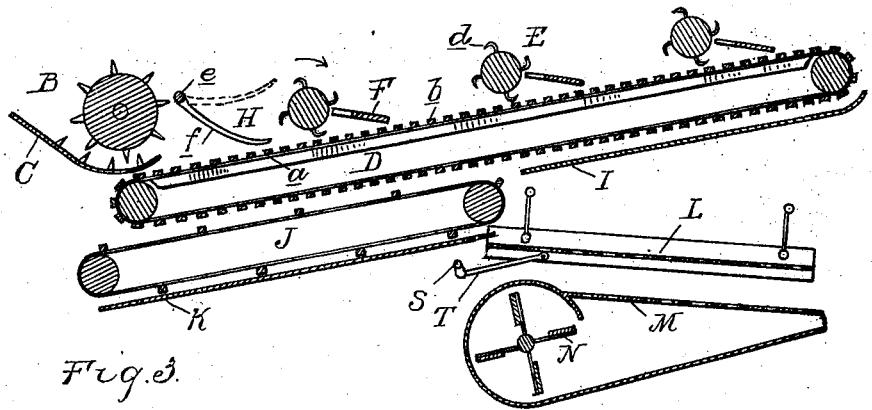
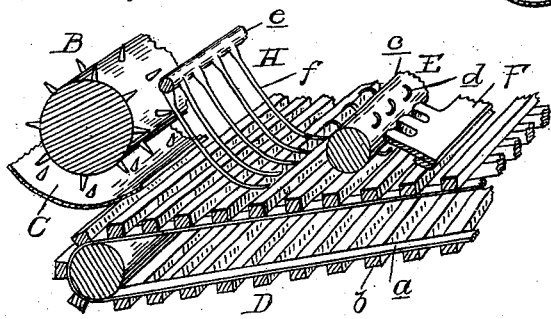
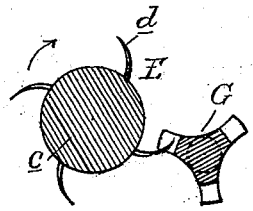
Witnesses
H. C. Smith.
W. D. Dogherty
Inventor
John A. Beam
By
Attys.
THE NORRIS PETERS CO., PHOTO-LITHO., WASHINGTON, D. C.

UNITED STATES PATENT OFFICE.

JOHN A. BEAM, OF BADEN, CANADA.

THRESHING-MACHINE.

SPECIFICATION forming part of Letters Patent No. 690,690, dated January 7, 1902.

Application filed June 11, 1900. Renewed October 2, 1901. Serial No. 77,294. (No model.)

*To all whom it may concern:*

Be it known that I, JOHN A. BEAM, a subject of the Queen of Great Britain, residing at Baden, in the Province of Ontario and Dominion of Canada, have invented certain new and useful Improvements in Threshing-Machines, of which the following is a specification, reference being had therein to the accompanying drawings.

The invention relates to threshing-machines, and more particularly to the means employed for separating the grain from the straw after it has passed the threshing-cylinder.

The invention consists in the peculiar construction, arrangement, and combination of parts, as hereinafter described and claimed.

In the drawings, Figure 1 is a diagram elevation of my threshing-machine. Fig. 2 is a longitudinal section therethrough. Fig. 3 is a perspective view showing a portion of the carrier, together with the threshing-cylinder, the revolving separator, and the beater. Fig. 4 is a section showing a slight modification of the revolving separator.

A is a framework of any suitable form. B is the threshing-cylinder arranged therein. C is the concave, and D is the endless carrier, which extends from the concave to the rear of the machine and is inclined slightly upward. This carrier is preferably formed of endless side chains or belts $a$ and the cross-bars $b$. Arranged above this carrier and extending across the machine are a series of rotary separators E, which are of the following construction:

$c$ is a roll or cylinder journaled in bearings in the frame. $d$ represents curved teeth secured to this roll and preferably arranged in longitudinal and circumferential series. The roll is so arranged that the teeth $d$ will just clear the carrier in the rotation of the roll, which is in the direction indicated by the arrow—that is, turning over in the direction of travel of the carrier. The teeth $d$ are so curved that their points extend backward in relation to the direction of rotation. Adjacent to each roll is a slotted bar F, which forms a cleaner for the teeth of the separator. This cleaner may be either the stationary bar F, as shown in Figs. 2 and 3, or it may be a rotary bar, such as G. (Shown in Fig. 4.) In the latter construction I preferably form it of triangular shape, each corner being slotted and forming a cleaning-bar.

Several of the rotary separators E are preferably arranged above the carrier D, the drawings showing three, and between the first of these separators and the threshing-cylinders is a vibrating beater H. This beater comprises a rock-shaft $e$, to which a series of curved tines $f$ are secured, the rock-shaft being located close to the threshing-cylinder and the tines extending toward the cylinder E, but falling short thereof, so as to give sufficient clearance for the straw to pass over the cylinder $c$. Beneath the carrier D, at the rear of the machine, is an apron I, and beneath the forward portion of said carrier is the carrier J, having an apron K arranged thereunder.

L is an inclined longitudinal vibrating riddle having its upper end arranged beneath the discharge end of the carrier K and of the apron I.

M is a laterally-vibrating riddle beneath the riddle L, and N is a fan for directing an air-current up through said riddle.

The various operating parts of the machine may be driven by any suitable connecting mechanism; but as shown in Fig. 1 this comprises the following construction: The rotary separators E are belted in series, and the first one has a direct belt connection with the cylinder B, as indicated by the reference-letter O. The carrier D is driven at a much slower speed by means of belt connection $O'$ between a small pulley on the shaft of the roll B and a large pulley on the shaft $O^2$, which latter is connected by a belt $O^3$ with the shaft at the rear end of the carrier. The carrier J is driven by means of a cross belt connection P with the carrier D, which causes the cross-bars on the lower side of the carrier to be drawn upward in contact with the apron K, as indicated by the arrow. The fan N has preferably a direct belt connection Q with the cylinder B, and from the fan-shaft is a belt or chain connection R to the shaft S, which has a crank connected to a pitman T, forming the vibrating means for the riddle L. The lateral vibratory movement imparted to the riddle M may be produced by any suitable connection, which is not, however, shown in the drawings, as it forms no part of the invention. The shaft e of the beater is operated by a pitman U, connecting it to a crank V on the roll c.

The parts being constructed as shown and described, the operation is as follows: The grain to be threshed first passes between the threshing-cylinder and concave and is discharged onto the lower end of the carrier D, which will carry it toward the rear of the machine. When first deposited on the carrier, the straw is subjected to the action of the beater H, which is rapidly vibrated by the crank V and pitman U, so as to knock the grain from the straw. After passing the beater H the straw comes in contact with the rotary separator E, the teeth of which will pick it up and carry it over the roll, throwing it down again upon the opposite side. As the teeth of this separator are curved backward in relation to the direction of rotation, they will not become permanently engaged with the straw and can be easily cleaned in passing through the slotted cleaner-bar F. With each succeeding separator E the straw is treated in the same manner, being lifted over and thrown down, so that by the time it reaches the end of the carrier the grain is thoroughly eliminated therefrom. The grain separated by this treatment drops through the bars of the carrier onto the apron I or through the carrier J onto the apron K. That on the apron I will descend by gravity to its lower end and be deposited upon the riddle L, while that falling on the apron K is drawn upward by the bars of the carrier and is also deposited on said riddle. From the riddle L the grain will pass to the riddle M and is finally discharged through a suitable spout. (Not shown.)

A machine constructed as above described is exceedingly effective in separating all the grain from the straw and is also free from clogging. This is due to the peculiar character of the rotary separators employed in connection with the vibratory beater, which latter prevents the straw from being shot out from the cylinder B over the first separator E. The tines f of this beater are also curved, so as to be easily disengaged from the straw and avoid clogging.

What I claim as my invention is—

1. In a threshing-machine, the combination with the threshing-cylinder, its concave and an endless straw-carrier, extending rearwardly therefrom, of a rotary separator comprising a cylinder having teeth curving backward in relation to the direction of rotation, said cylinder being arranged across said carrier and adapted to pick up the straw therefrom and throw it over, and a vibratory beater arranged between said threshing and separator cylinders, for the purpose described.

2. In a threshing-machine, the combination with a threshing-cylinder, its concave and an endless straw-carrier extending rearwardly therefrom, of a series of rotary separators arranged above said carrier, each comprising a cylinder having teeth curving backward in relation to the direction of rotation, a cleaning comb or bar for each separator, and a vibratory beater arranged between the threshing-cylinder and the adjacent rotary separator, for the purpose described.

In testimony whereof I affix my signature in presence of two witnesses.

JOHN A. BEAM.

Witnesses:
M. B. O'DOGHERTY,
H. C. SMITH.